(12) United States Patent
Yang et al.

(10) Patent No.: US 12,336,673 B2
(45) Date of Patent: Jun. 24, 2025

(54) QUICK ASSEMBLY AND DISASSEMBLY STRUCTURE OF A TOILET SEAT BASE

(71) Applicant: XIAMEN JOPEO CO., LTD., Fujian (CN)

(72) Inventors: Bin Yang, Fujian (CN); Qi Chen, Fujian (CN); Xiang Ye Lin, Fujian (CN)

( * ) Notice: Subject to any disclaimer, the term of this patent is extended or adjusted under 35 U.S.C. 154(b) by 85 days.

(21) Appl. No.: 18/139,967

(22) Filed: Apr. 27, 2023

(65) Prior Publication Data

US 2024/0188772 A1  Jun. 13, 2024

(30) Foreign Application Priority Data

Dec. 12, 2022 (CN) .......................... 202223338216.8

(51) Int. Cl.
A47K 13/26 (2006.01)
(52) U.S. Cl.
CPC .................................. *A47K 13/26* (2013.01)
(58) Field of Classification Search
CPC ........................ A47K 13/12; A47K 13/28
USPC ............................................................ 4/237
See application file for complete search history.

(56) References Cited

U.S. PATENT DOCUMENTS 9,107,547 B2 * 8/2015 Hand ...................... A47K 13/26
2013/0312171 A1 * 11/2013 Yang ...................... A47K 13/26
 4/240

* cited by examiner

*Primary Examiner* — Lauren A Crane

(57) ABSTRACT

A quick assembly and disassembly structure of a toilet seat base, including a supporting base, base boards, lid bodies, and axial hole portions and connecting portions on the supporting base; each connecting portion is provided with a sliding groove; each base board is slidable back and forth within a corresponding sliding groove and non-movable vertically within the corresponding sliding groove; one end of each lid body is pivotally connected with a corresponding connecting portion; a bottom surface of each lid body is provided with positioning ribs; a top surface of each connecting portion is provided with positioning holes; the positioning holes of each connecting portion are in communication to a corresponding sliding groove. When each lid body is closed, the positioning ribs pass through the positioning holes and fit with the positioning grooves, so that each base board and a corresponding sliding groove are fixed.

6 Claims, 17 Drawing Sheets

QUICK ASSEMBLY AND DISASSEMBLY STRUCTURE OF A TOILET SEAT BASE

FIELD OF THE INVENTION

The present invention relates to the field of toilet seat bases, and more particularly a quick assembly and disassembly structure of a toilet seat base.

BACKGROUND OF THE INVENTION

A toilet seat is usually installed onto a ceramic body of a toilet bowl through a toilet seat base, which allows the toilet seat to be flipped up and down in respect to the ceramic body. Typically, the toilet seat base contains many blind spots for cleaning. Also, the toilet seat base is fixed onto the ceramic body with bolts and nuts, thus being difficult to disassemble, and causing inconvenience to cleaning.

Therefore, various quick disassembly structures are provided in the prior art to achieve a quick disassembly of a toilet seat base. For example, a Chinese patent CN209421821U has disclosed a quick disassembly structure of toilet seat and a toilet bowl; as illustrated in FIG. 1, said quick disassembly structure comprises a cylindrical body 1 in a rotary fit with a toilet seat, a base 2 for fixing the body 1, a locking component 3 for connecting or disconnecting the body 1 and the base 2, and an elastic piece 4 arranged between the body 1 and the locking component 3; the base 2 comprises a bottom base 21 and a supporting column 22; an upper snapping groove 221 and a lower snapping groove 222 are formed on a top part of the supporting column 22; a column hole is formed along a radial direction of the body 1 and extends through the body 1; a locking plate movement hole and a hook movement hole which open towards a direction perpendicular to openings of the column hole, and in communication with the column hole, are provided axially on the body 1; the locking component 3 comprises a button 31, a locking plate 33 being fixedly connected with the button 31, and two hooks 34 arranged on two sides below the locking plate 33 respectively; a locking hole 30 is formed on the locking plate 33; an edge of the locking hole 30 is snap-fitting with the upper snapping groove 221. During disassembly, the button 31 only needs to be pressed once instead of being pressed and held, so as to maintain the locking hole 30 of the locking plate 33 of the locking component 3 at an unlocking position at an end of the supporting column 22 of the base 2, which allows the supporting column 22 to be pulled out from the column hole of the body 1; after pulling out the supporting column 22, the locking component 3 restores its position automatically without the need to press the button 31 again, thereby greatly facilitating a disassembly process of the toilet seat.

In the patent above, the elastic piece 4 is mainly a spring, which is prone to malfunction due to rusting or aging when being used in a humid environment, such as a bathroom, thus leading to a short service life and an unstable operating status of the quick disassembly structure; besides, a user needs to press the button 31 and overcome an elastic force of the spring during a disassembly process, so as to place the locking hole 30 at an unlocking position at an end of the supporting column 22 of the base 2, which is labor-consuming to operate, and not easy to judge whether the button 31 is pressed into place.

BRIEF SUMMARY OF THE INVENTION

It is an object of the present invention to provide a quick assembly and disassembly structure of a toilet seat base, in order to solve the problems of labor-consuming operation and unstable operating status of the prior art.

To attain the above object, the technical solutions of the present invention are as follows:

A quick assembly and disassembly structure of a toilet seat base, comprising a supporting base, base boards and lid bodies; two ends of a top surface of the supporting base are provided with axial hole portions respectively configured for installing a toilet seat; two ends of a rear side of the supporting base are provided with connecting portions respectively; a rear side of each connecting portion is provided with a sliding groove extending towards a front side of the connecting portion; the base boards are connected with a ceramic body of a toilet bowl; each base board is slidable back and forth within a corresponding sliding groove and being limited from moving along a vertical direction within the corresponding sliding groove; one end of each lid body is pivotally connected with a corresponding connecting portion; a bottom surface of each lid body is provided with a plurality of positioning ribs; a top surface of each connecting portion is provided with positioning holes; the positioning holes of each connecting portion are in communication to a corresponding sliding groove; each base board is provided with positioning grooves; when each lid body is closed, the positioning ribs thereof pass through the positioning holes of a corresponding connecting portion, and fit with the positioning grooves of a corresponding base board, so that each base board and a corresponding sliding groove are fixed in position with respect to each other when each based board is slid inside the corresponding sliding groove.

Left and right side walls of each sliding groove are provided with guiding grooves respectively; a front end of each guiding groove is provided with a limiting rib; left and right sides of each base board are provided with guiding ribs respectively; each guiding rib is in a sliding fit with a corresponding guiding groove and is in contact with a corresponding limiting rib; a top wall of each sliding groove is provided with a pre-assembled rib; a top surface of each base board is provided with a pre-assembled groove; each pre-assembled rib is removably fitted inside a corresponding pre-assembled groove; each pre-assembled rib is provided with a trapezoidal cross sectional surface or an arc-shaped cross sectional surface.

A bottom surface of another end of each lid body is provided with a buckle; the top surface of each connecting portion is provided with a buckle hole which is in communication to a corresponding sliding roove; each base board is provided with a buckle groove; when each lid body is closed, the buckle thereof passes through a corresponding buckle hole and is buckled to a corresponding buckle groove.

Each base board is fixedly connected to the ceramic body of the toilet bowl through a bolt; each connecting portion is provided with an operating window for tightening and twisting a corresponding bolt.

An anti-skid pad is provided below each base board; a bottom surface of each base board is provided with a plurality of inserting grooves; a top surface of each anti-skid pad is provided with a plurality of inserting blocks matching with the inserting grooves of a corresponding base board; the inserting blocks of each anti-skid pad are inserted into the inserting grooves of the corresponding base board.

Locking of the base boards according to embodiment 1: The quick assembly and disassembly structure of a toilet seat base, further comprising front-rear locking blocks and left-right locking blocks; each base board is provided with a first adjusting hole extending along a front-rear direction of the base board; each front-rear locking block is movably fitted with a corresponding first adjusting hole, and is capable of moving along a front-rear direction of the corresponding first adjusting hole; each front-rear locking block is provided with a second adjusting hole extending along a left-right direction of the front-rear locking block; each left-right locking block is movably fitted with a corresponding second adjusting hole, and is capable of moving along a left-right direction of the corresponding second adjusting hole; each left-right locking block is provided with a first bolt hole to receive a corresponding bolt.

Preferably, left and right side walls of each first adjusting hole are provided with first protruding edges respectively; a top surface of each first protruding edge is provided with a plurality of first anti-skid teeth; two ends of each front-rear locking block are fitted with the first protruding edges on the left and right side walls of a corresponding first adjusting hole respectively; said two ends of each front-rear locking block are provided with a plurality of second anti-skid teeth respectively meshing with the first anti-skid teeth of a corresponding first adjusting hole.

Preferably, front and rear side walls of each second adjusting hole are provided with second protruding edges respectively; a top surface of each second protruding edge is provided with a plurality of third anti-skid teeth; two sides of each left-right locking block are fitted with the second protruding edges on the front and rear side walls of a corresponding second adjusting hole; each left-right locking block is provided with a plurality of forth anti-skid teeth meshing with the third anti-skid teeth of the corresponding second adjusting hole.

Locking of the base boards according to embodiment 2: The quick assembly and disassembly structure of a toilet seat base, further comprising rotary locking blocks and radial locking blocks; each base board is provided with a round-shaped third adjusting hole; each rotary locking block is in rotary fit with a corresponding third adjusting hole, so that an orientation of each rotary locking block is adjustable by rotation with respect to the corresponding third adjusting hole; each rotary locking block is provided with a forth adjusting hole extending along a radial direction thereof; each radial locking block is movably fitted with a corresponding forth adjusting hole, and is capable of adjusting position along a radial direction of a corresponding rotary locking block; each radial locking block is provided with a second bolt hole to receive a corresponding bolt.

Preferably, a side wall of each third adjusting hole is provided with an annular third protruding edge; a top surface of each third protruding edge is provided with a plurality of fifth anti-skid teeth; a periphery of each rotary locking block is movably fitted with a corresponding third protruding edge, and is provided with a plurality of sixth anti-skid teeth meshing with the fifth anti-skid teeth of a corresponding third adjusting hole.

Preferably, two sides of each forth adjusting hole is provided with forth protruding edges respectively; a top surface of each forth protruding edge is provided with a plurality of seventh anti-skid teeth; two sides of each radial locking block are fitted with the forth protruding edges on the two sides of a corresponding forth adjusting hole, and are provided with a plurality of eighth anti-skid teeth meshing with the seventh anti-skid teeth of the corresponding forth adjusting hole.

The beneficial effects of the present invention are as follows:

1. the present invention limits or allows the movement of each base board inside a corresponding sliding groove by a flipping movement of each lid body on a top surface of a corresponding connecting portion of the supporting base, thereby achieving a quick assembly and disassembly of the supporting base and the base boards, in other words, completing a quick assembly and disassembly of the toilet seat base on the ceramic body of the toilet bowl; it is convenient for cleaning simply by removing the supporting base and the toilet seat assembled thereon;
2. the present invention does not require the use of an elastic piece, so that each component thereof has a stable structure without elastic deformation, which is capable of maintaining a stable operating status, and providing a longer service life;
3. An assembling or disassembling operation of the present invention can be completed simply by flipping up or down each lid body, and pushing or pulling the supporting base, while the operating process is completely visible, thus achieving an easy and convenient operation.

DETAILED DESCRIPTION OF THE INVENTION

To further explain the technical solutions of the present invention, the following will describe in detail the present invention with reference to the specific embodiments.

Figure 15:
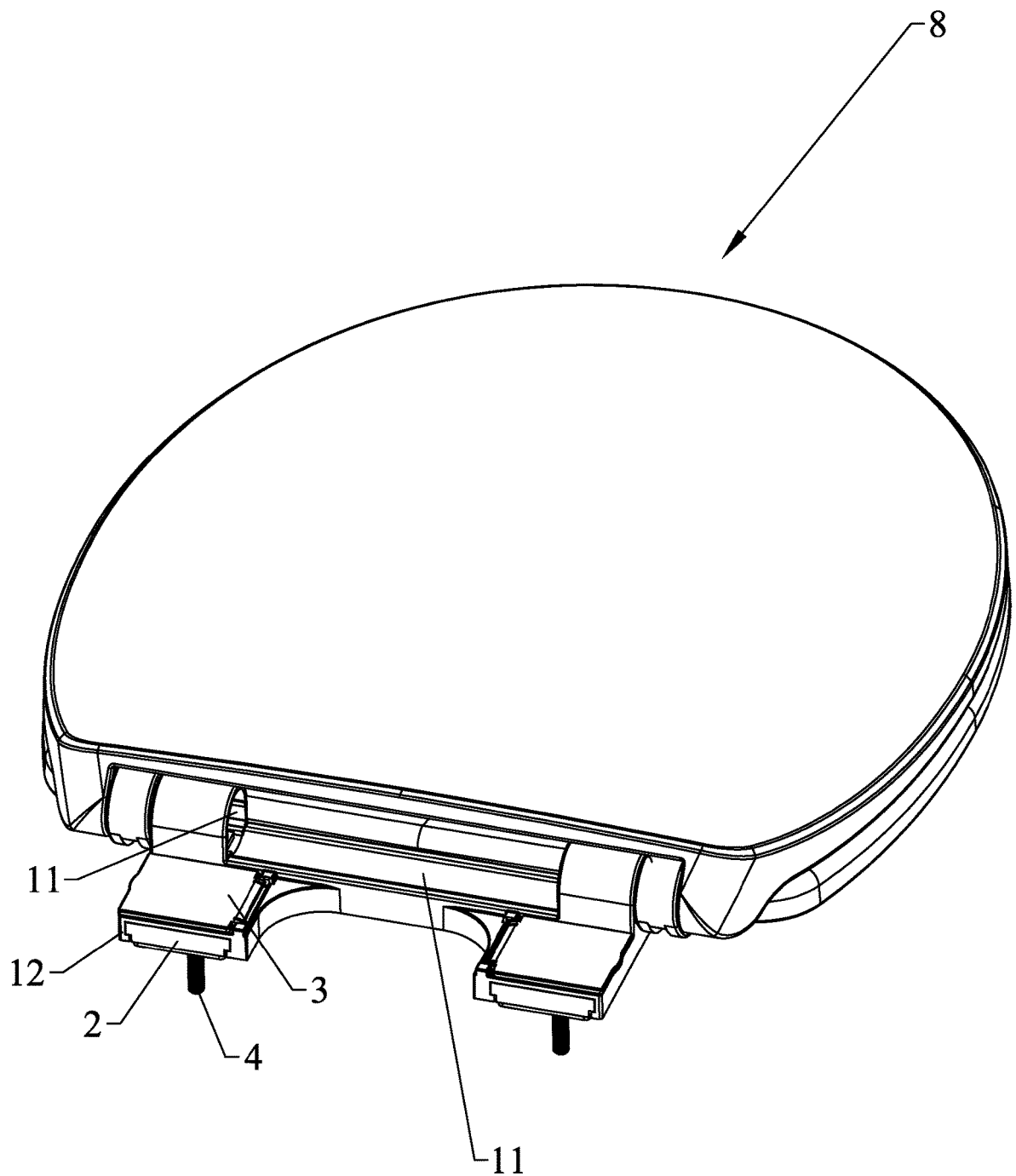
FIG. 15 shows a perspective view of the first embodiment of the present invention being fitted with the toilet seat.
Figure 16:
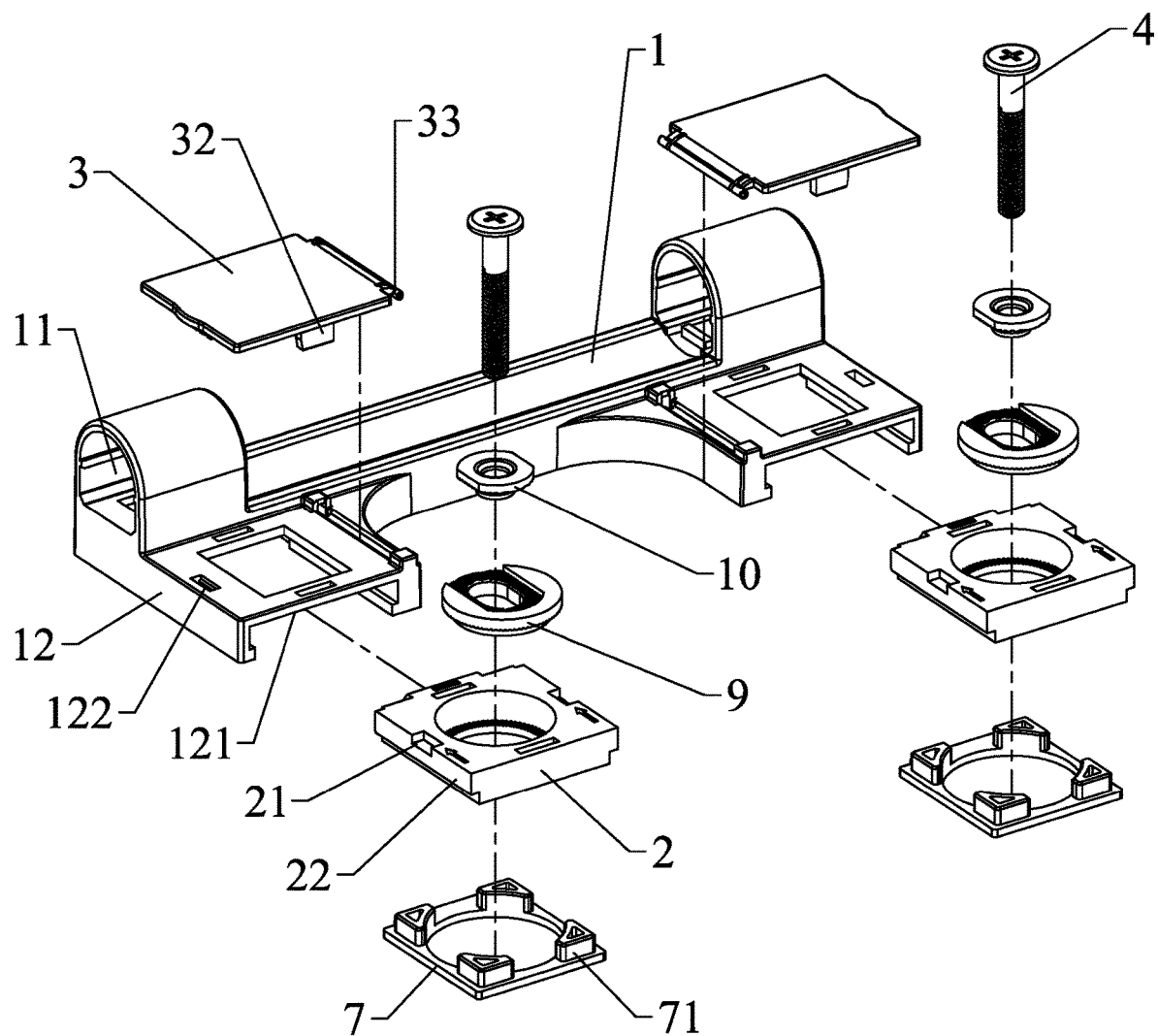
FIG. 16 shows an exploded view of the second embodiment of the present invention.
Figure 17:
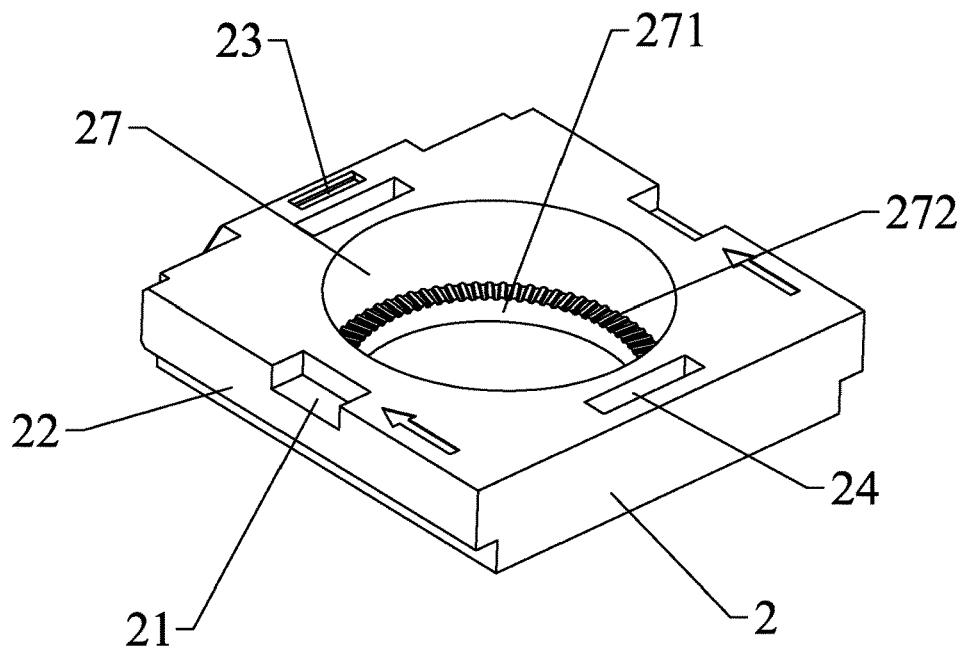
FIG. 17 shows a first perspective view of the base board of the second embodiment of the present invention.
Figure 18:
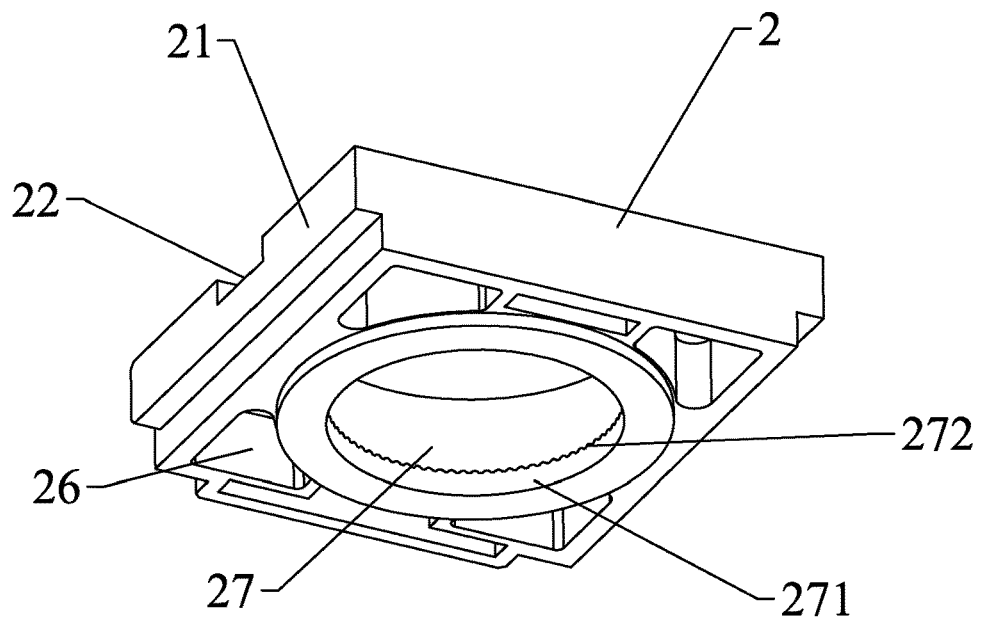
FIG. 18 shows a second perspective view of the base board of the second embodiment of the present invention.
Figure 19:
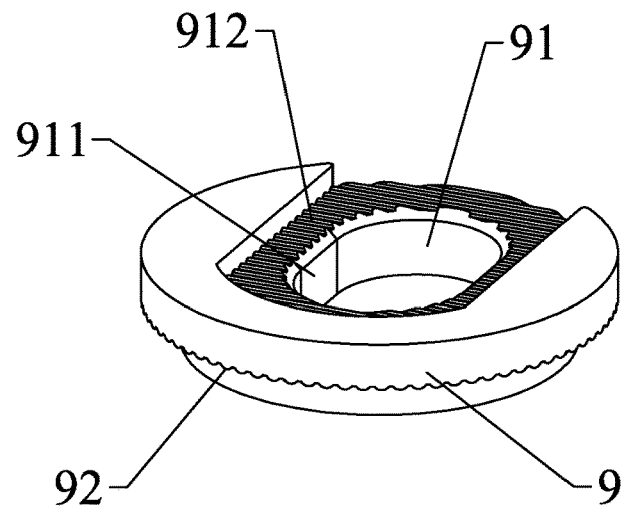
FIG. 19 shows a first perspective view of the rotary locking block of the second embodiment of the present invention.
Figure 20:
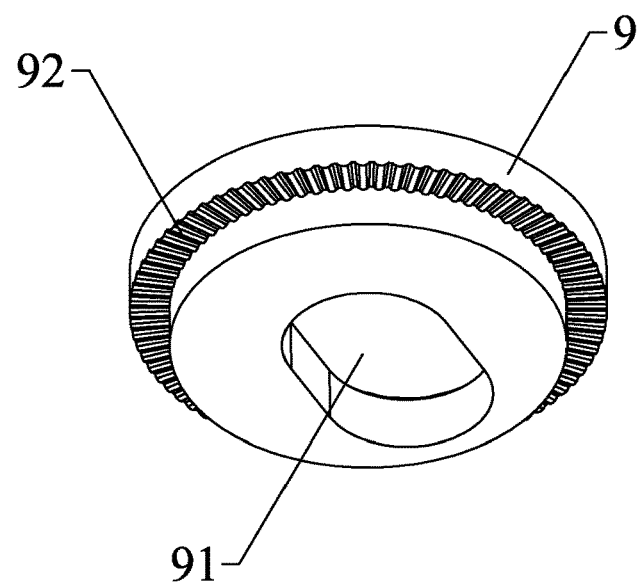
FIG. 20 shows a second perspective view of the rotary locking block of the second embodiment of the present invention.
Figure 21:
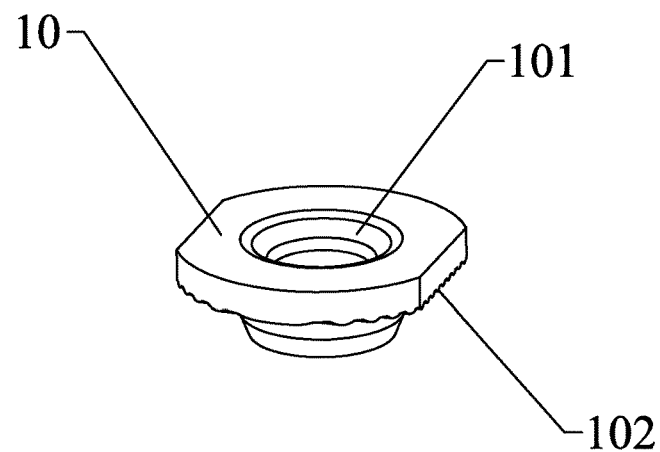
FIG. 21 shows a first perspective view of the radial locking block of the second embodiment of the present invention.
Figure 22:
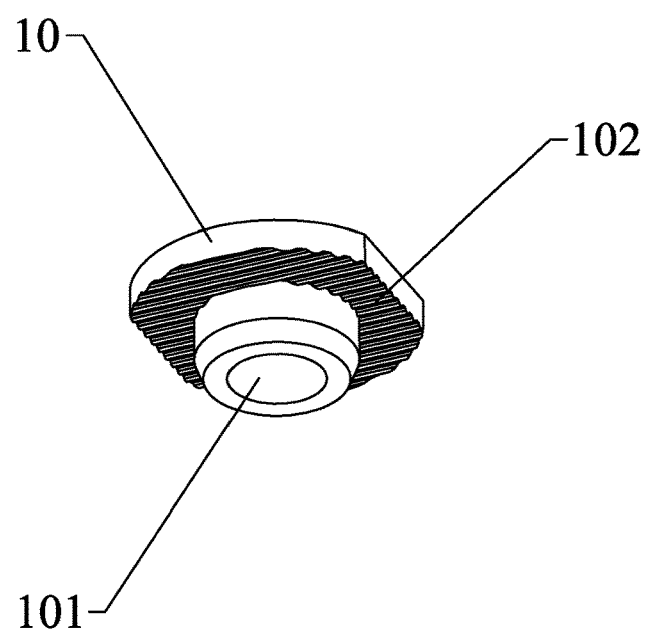
FIG. 22 shows a second perspective view of the radial locking block of the second embodiment of the present invention.
Figure 23:
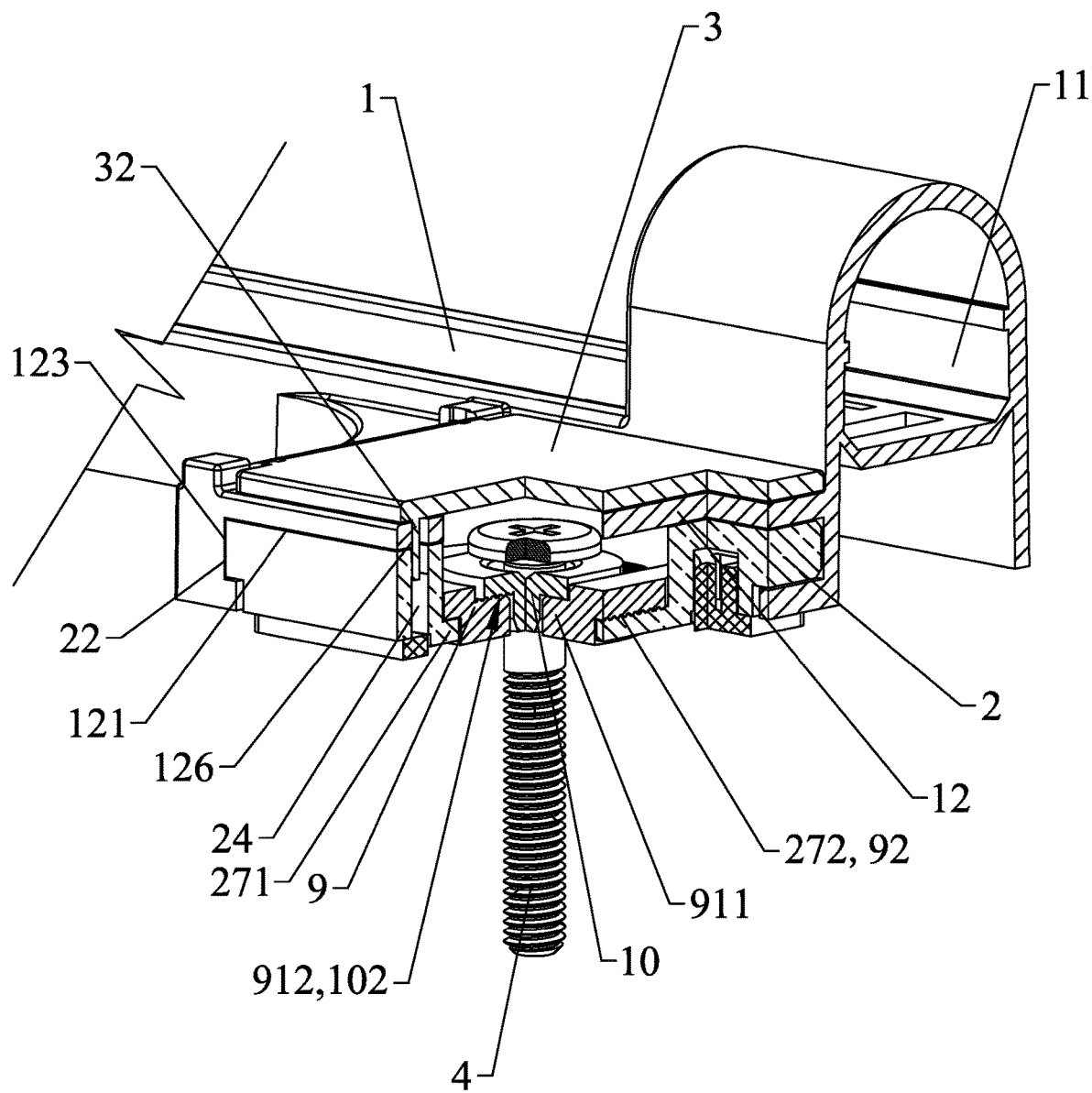
FIG. 23 shows a sectional view of the second embodiment of the present invention.

As illustrated in FIGS. 2-24, the present invention discloses a quick assembly and disassembly structure of a toilet seat base, comprising a supporting base 1, base boards 2 and lid bodies 3;

Two ends of a top surface of the supporting base 1 are provided with axial hole portions 11 respectively configured for installing a toilet seat 8; two ends of a rear side of the supporting base 1 are provided with connecting portions 12 respectively; a rear side of each connecting portion 12 is provided with a sliding groove 121 extending towards a front side of the connecting portion 12 ("front" in the description is defined as a side where the toilet seat 8 is arranged in a closed condition after being assembled to the supporting base 1, as shown in FIG. 15);

The base boards 2 are connected with a ceramic body of a toilet bowl; each base board 2 is slidable back and forth within a corresponding sliding groove 121 and being limited from moving along a vertical direction within the corresponding sliding groove 121;

One end of each lid body 3 is pivotally connected with a corresponding connecting portion 12; a bottom surface of each lid body 3 is provided with a plurality of positioning ribs 32; a top surface of each connecting portion 12 is provided with positioning holes 126; the positioning holes 126 of each connecting portion 12 are in communication to a corresponding sliding groove 121; each base board 2 is provided with positioning grooves 24; when each lid body 3 is closed, the positioning ribs 32 thereof pass through the positioning holes 126 of a corresponding connecting portion 12, and fit with the positioning grooves 24 of a corresponding base board 2, so that each base board 2 and a corresponding sliding groove 121 are fixed in position with respect to each other when each based board 2 is slid inside the corresponding sliding groove 121.

Specific embodiments of the present invention are illustrated below.

In some of the embodiments of the present invention, left and right side walls of each sliding groove 121 are provided with guiding grooves 123 respectively; a front end of each guiding groove 123 is provided with a limiting rib 124; left and right sides of each base board 2 are provided with guiding ribs 22 respectively; each guiding rib 22 is in a sliding fit with a corresponding guiding groove 123; an assembling position is reached when each guiding rib 22 is in contact with a corresponding limiting rib 124; each base board 2 is being limited from moving along a vertical direction within a corresponding sliding groove 121 due to the guiding ribs 22 of each base board 2 and the guiding grooves 123 of the corresponding sliding groove 121.

In some of the embodiments of the present invention, a top wall of each sliding groove 121 is provided with a pre-assembled rib 125; a top surface of each base board 2 is provided with a pre-assembled groove 23; each pre-assembled rib 125 is removably fitted inside a corresponding pre-assembled groove 23, thereby achieving a pre-assembled positioning of each base board 2 with respect to a corresponding sliding groove 121, so that a certain degree of pre-tightening force is provided to prevent dislocation when each base board 2 is pushed into the corresponding sliding groove 121 and reaches the assembling position; each pre-assembled rib 125 is provided with a trapezoidal cross sectional surface or an arc-shaped cross sectional surface for each pre-assembled rib 125 to be removed from a corresponding pre-assembled groove 23.

In some of the embodiments of the present invention, a bottom surface of another end of each lid body 3 is provided with a buckle 31; the top surface of each connecting portion 12 is provided with a buckle hole 122 which is in communication to a corresponding sliding roove 121; each base board 2 is provided with a buckle groove 21; when each lid body 3 is closed, the buckle 31 thereof passes through a corresponding buckle hole 122 and is buckled to a corresponding buckle groove 21; after the buckle 31 of each lid body 3 is buckled to a corresponding buckle groove 21, the positioning rib 32 of said lid body 3 will not be easily loosened from a corresponding base board 2, so as to prevent said lid body 3 to be released.

In some of the embodiments of the present invention, each base board 2 is fixedly connected to the ceramic body of the toilet bowl through a bolt 4; each connecting portion 12 is provided with an operating window 127 for tightening and twisting a corresponding bolt 4.

A First Embodiment of the Present Invention is Illustrated in FIGS. 2-15

The first embodiment further comprises front-rear locking blocks 5 and left-right locking blocks 6; each base board 2 is provided with a first adjusting hole 25 extending along a front-rear direction of the base board 2; each front-rear locking block 5 is movably fitted with a corresponding first adjusting hole 25, and is capable of moving along a front-rear direction of the corresponding first adjusting hole 25; each front-rear locking block 5 is provided with a second adjusting hole 51 extending along a left-right direction of the front-rear locking block 5; each left-right locking block 6 is movably fitted with a corresponding second adjusting hole 51, and is capable of moving along a left-right direction of the corresponding second adjusting hole 51; each left-right locking block 6 is provided with a first bolt hole 61 to receive a corresponding bolt 4. A position of each bolt 4 within a corresponding base board 2 can be adjusted by positional adjustments in a front-rear direction and a left-right direction through a corresponding front-rear locking block 5 and a corresponding left-right locking block 6 respectively; therefore, a structure of the toilet seat base is adaptable to deviations of different toilet installation holes as well as different toilet bowls in accordance with a variety of national standards and brands, thereby achieving wider versatility.

Furthermore, left and right side walls of each first adjusting hole 25 are provided with first protruding edges 251 respectively; a top surface of each first protruding edge 251 is provided with a plurality of first anti-skid teeth 252; two ends of each front-rear locking block 5 are fitted with the first protruding edges 251 on the left and right side walls of a corresponding first adjusting hole 25 respectively; said two ends of each front-rear locking block 5 are provided with a plurality of second anti-skid teeth 52 respectively meshing with the first anti-skid teeth 252 of a corresponding first adjusting hole 25. Meshing between the first anti-skid teeth 252 and the second anti-skid teeth 52 prevents each front-rear locking block 5 to slide on corresponding first protruding edges 251 of the corresponding first adjusting hole 25, thereby maintaining a stability of each front-rear locking block 5 after a position adjustment; meanwhile, each front-rear locking block 5 is in clearance fit with both the left and right side walls of the corresponding first adjusting hole 25.

Furthermore, front and rear side walls of each second adjusting hole 51 are provided with second protruding edges 511 respectively; a top surface of each second protruding edge 511 is provided with a plurality of third anti-skid teeth 512; two sides of each left-right locking block 6 are fitted with the second protruding edges 511 on the front and rear side walls of a corresponding second adjusting hole 51; each left-right locking block 6 is provided with a plurality of forth anti-skid teeth 62 meshing with the third anti-skid teeth 512 of the corresponding second adjusting hole 51. Meshing between the third anti-skid teeth 512 and the corresponding forth anti-skid teeth 62 prevents each left-right locking block 6 to slide one corresponding second protruding edges 511 of the corresponding second adjusting hole 51, thereby maintaining a stability of each left-right locking block 6 after a position adjustment; meanwhile, each left-right locking block 6 is in clearance fit with both front and rear side walls of the corresponding second adjusting hole 51.

An anti-skid pad 7 is provided below each base board 2, which improves an anti-skid effect of the toilet seat base after being installed onto the ceramic body, and reduces shaking of the toilet seat base and the assembled toilet seat on the ceramic body.

Furthermore, a bottom surface of each base board 2 is provided with a plurality of inserting grooves 26; a top surface of each anti-skid pad 7 is provided with a plurality of inserting blocks 71 matching with the inserting grooves 26 of a corresponding base board 2; a detachable fit of each anti-skid pad 7 and the corresponding base board 2 is achieved by embedding the inserting blocks 71 of said anti-skid pad 7 into the inserting grooves 26 of said base board 2.

Figure 1:
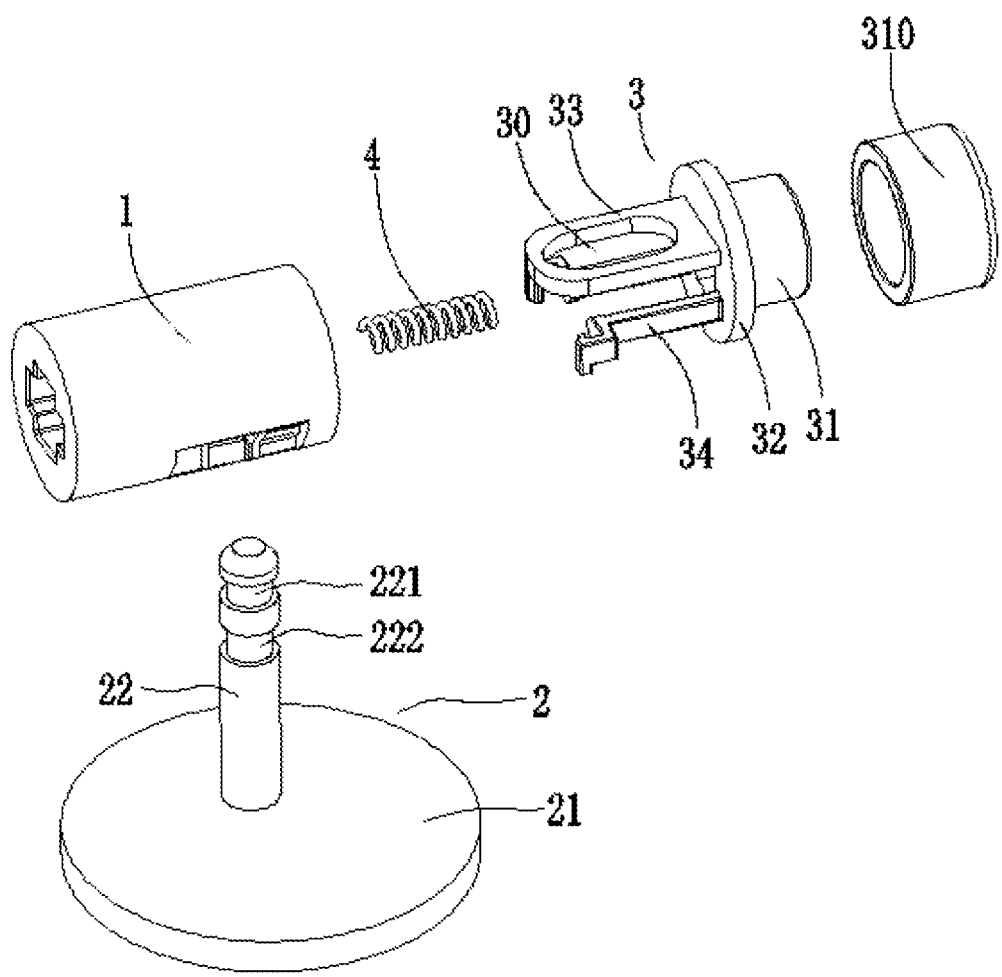
FIG. 1 shows a drawing for the abstract of the patent CN209421821U.
Figure 2:
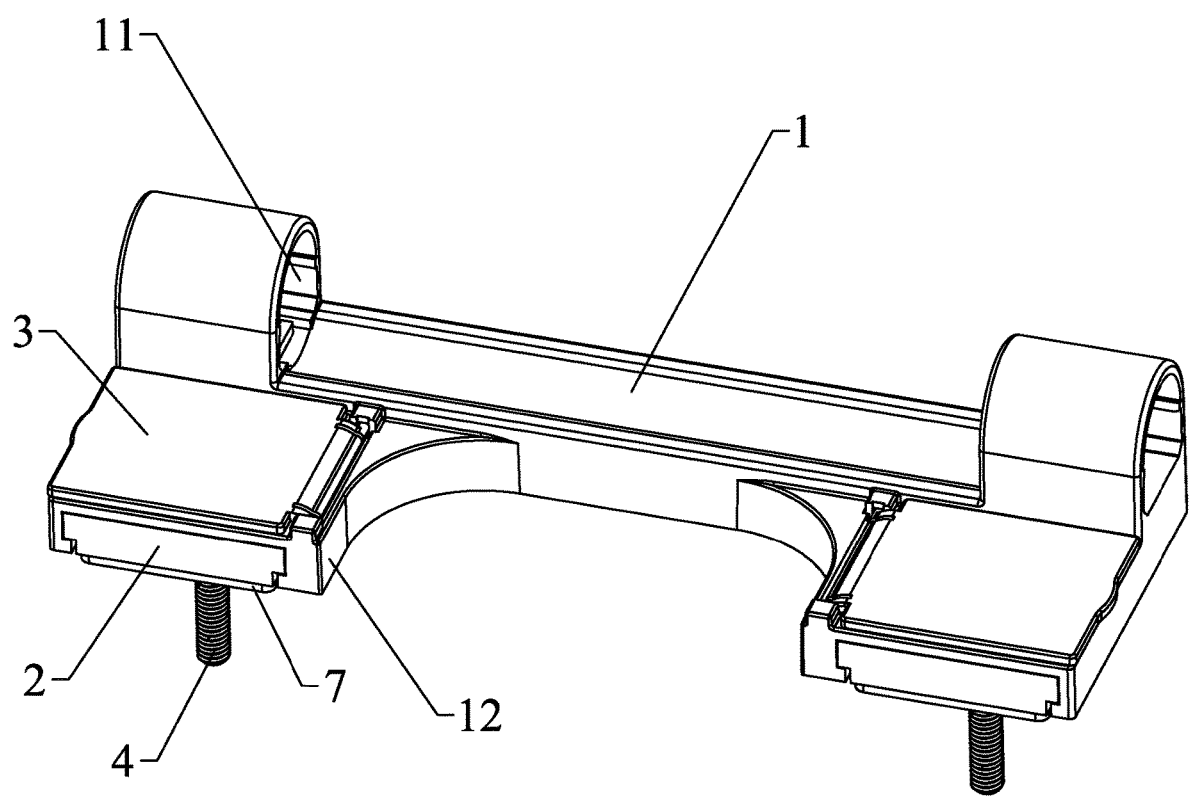
FIG. 2 shows a perspective view of the first embodiment of the present invention.
Figure 3:
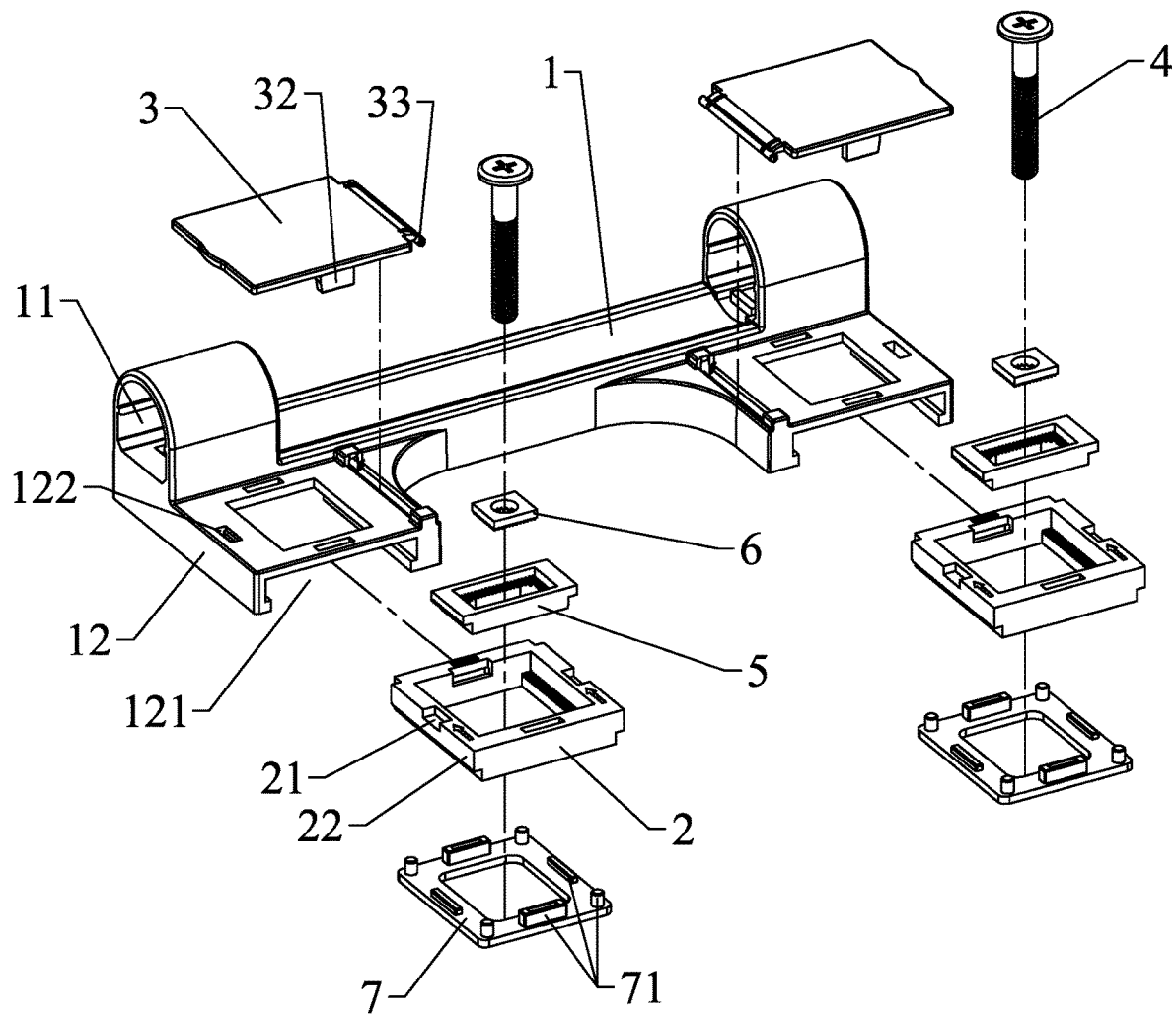
FIG. 3 shows an exploded view of the first embodiment of the present invention.
Figure 4:
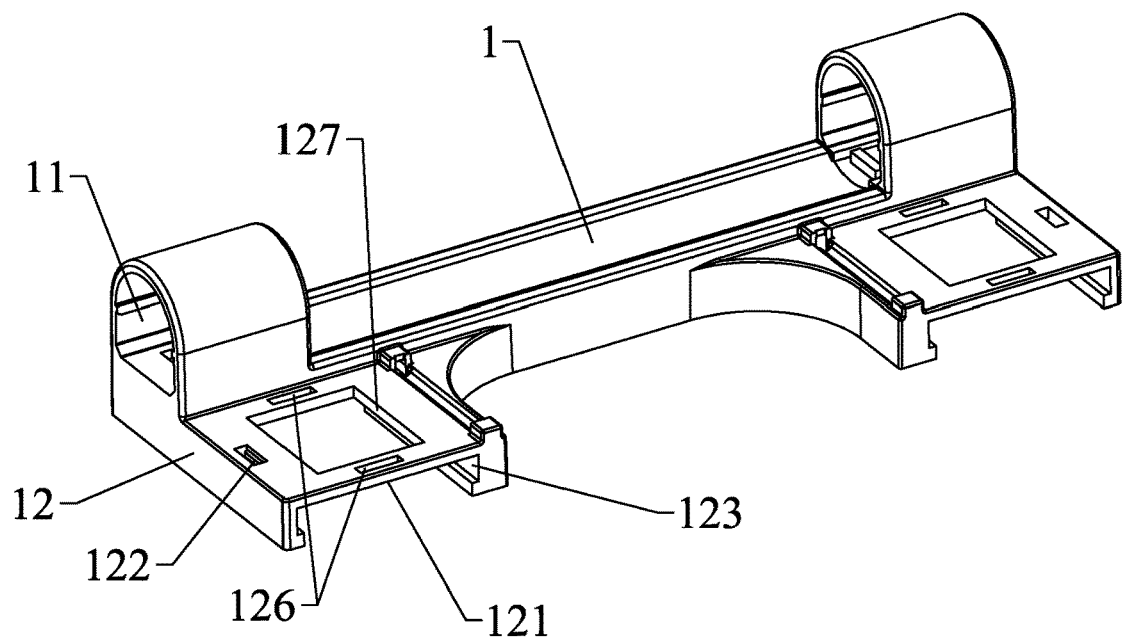
FIG. 4 shows a first perspective view of the supporting base of the first embodiment of the present invention.
Figure 5:
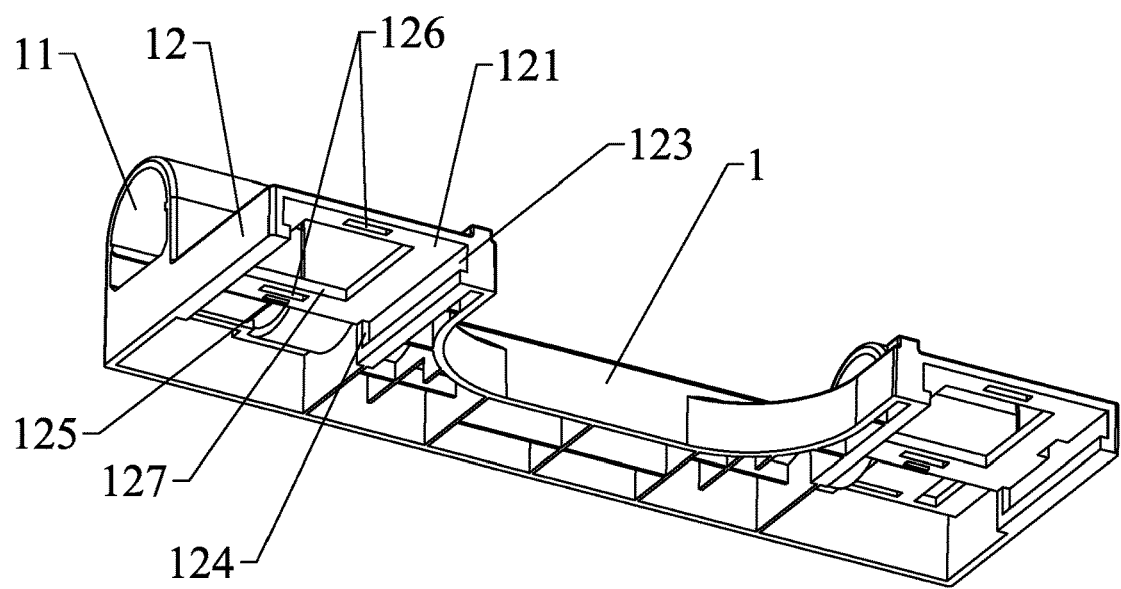
FIG. 5 shows a second perspective view of the supporting base of the first embodiment of the present invention.
Figure 6:
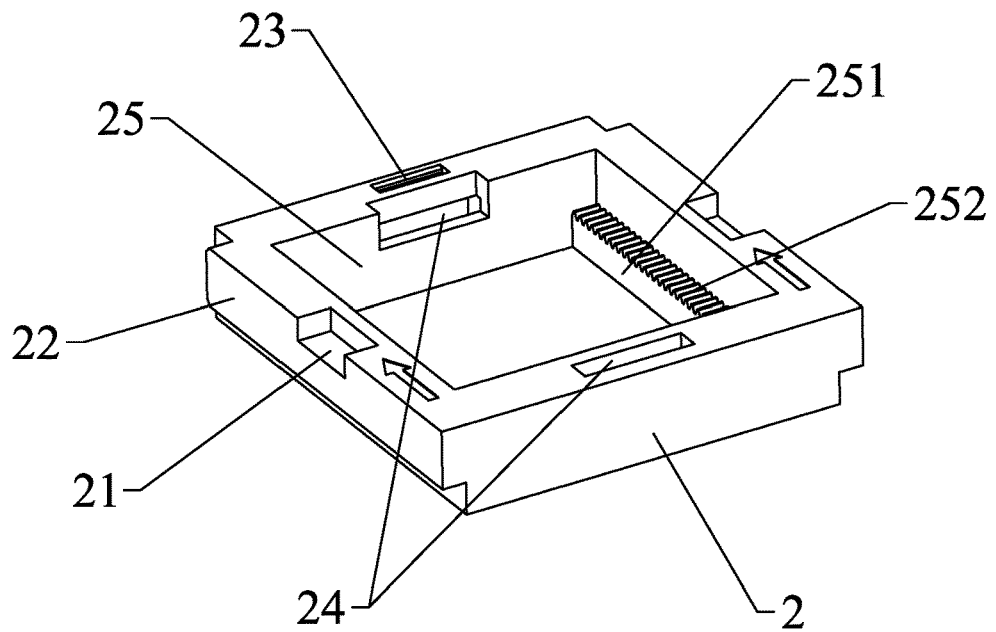
FIG. 6 shows a first perspective view of the base board of the first embodiment of the present invention.
Figure 7:
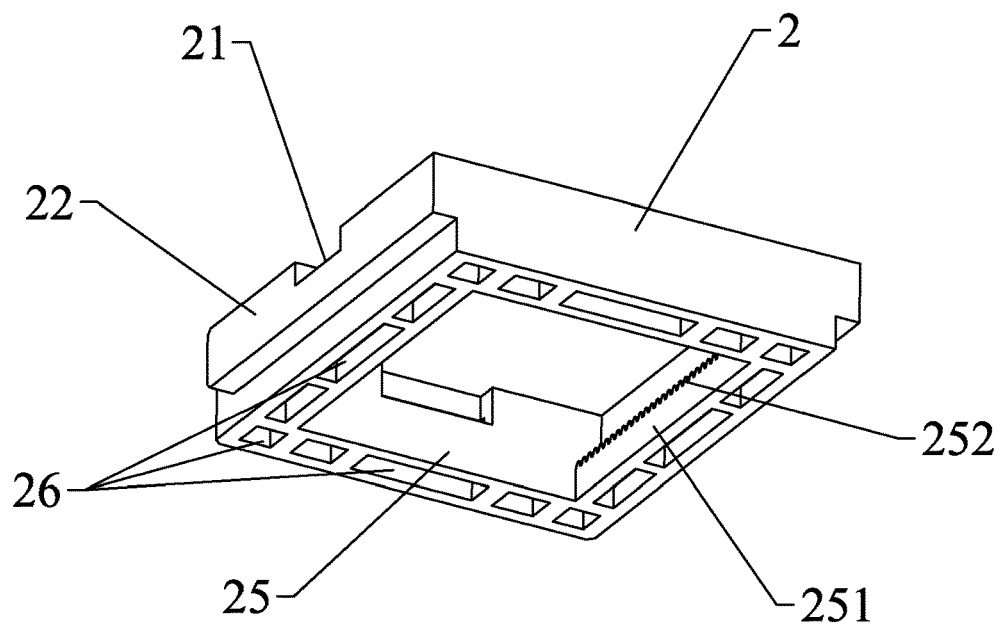
FIG. 7 shows a second perspective view of the base board of the first embodiment of the present invention.
Figure 8:
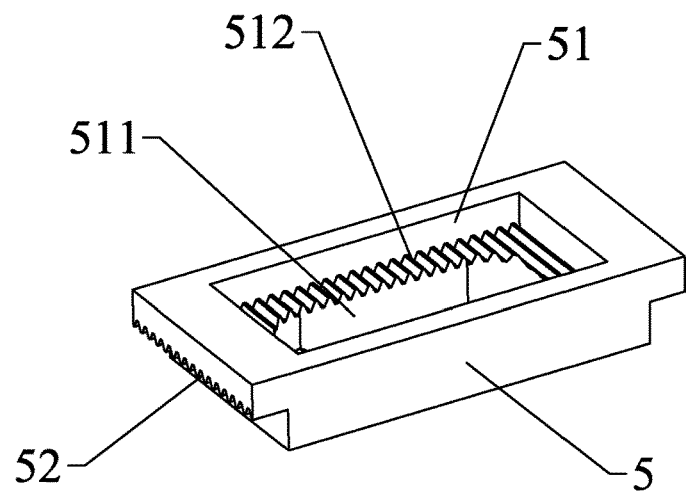
FIG. 8 shows a first perspective view of the front-rear locking block of the first embodiment of the present invention.
Figure 9:
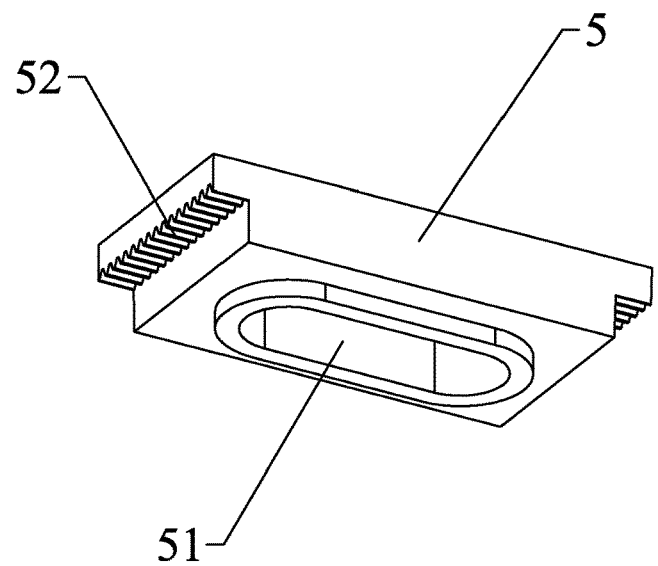
FIG. 9 shows a second perspective view of the front-rear locking block of the first embodiment of the present invention.
Figure 10:
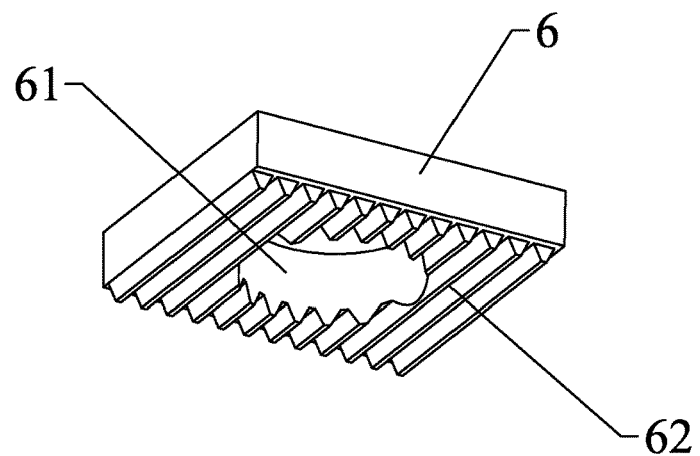
FIG. 10 shows a perspective view of the left-right locking block of the first embodiment of the present invention.
Figure 11:
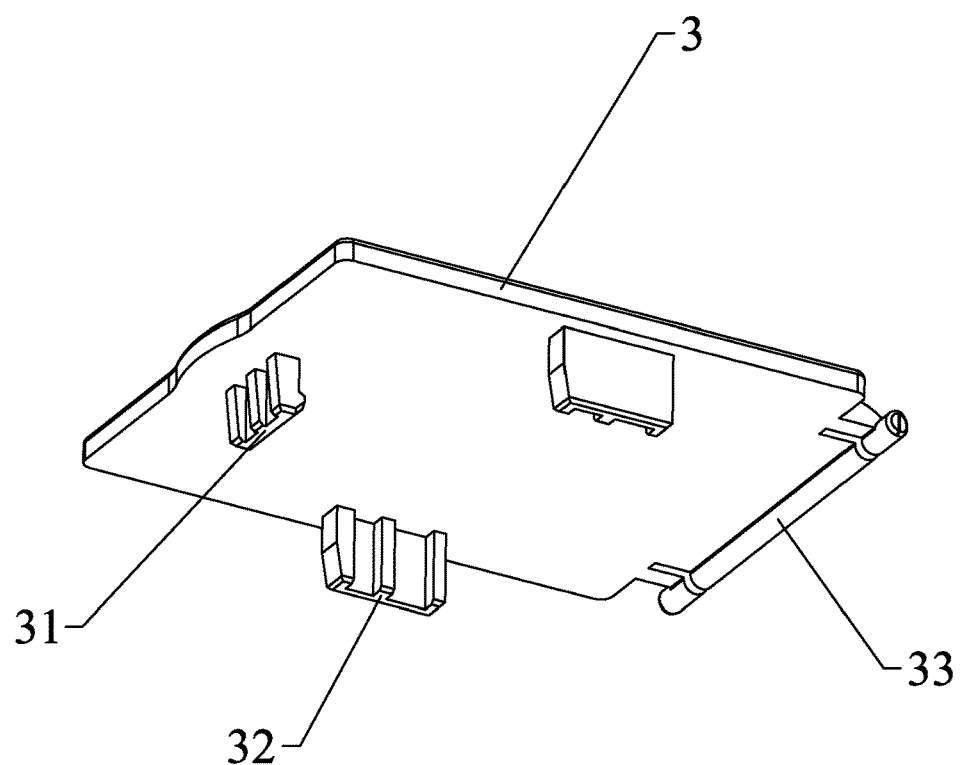
FIG. 11 shows a perspective view of the lid body of the first embodiment of the present invention.
Figure 12:
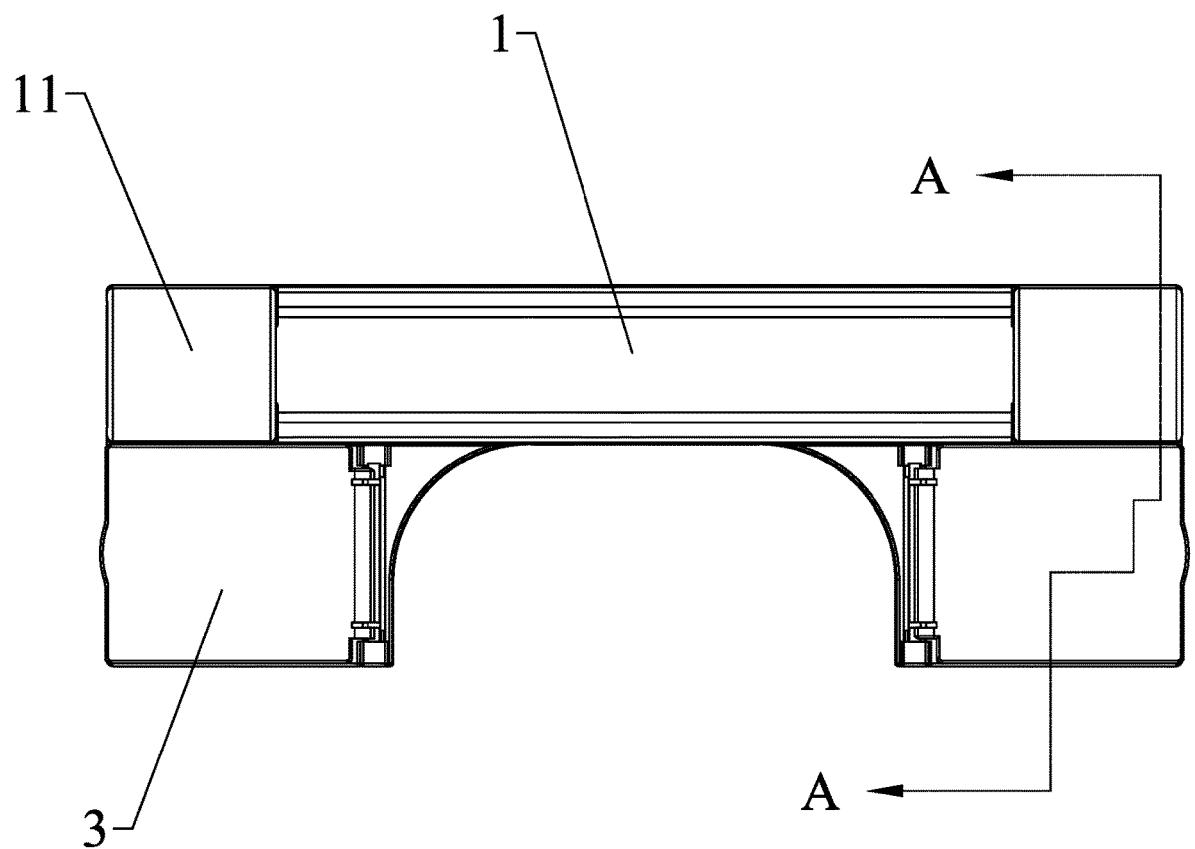
FIG. 12 shows a top view of the first embodiment of the present invention.
Figure 13:
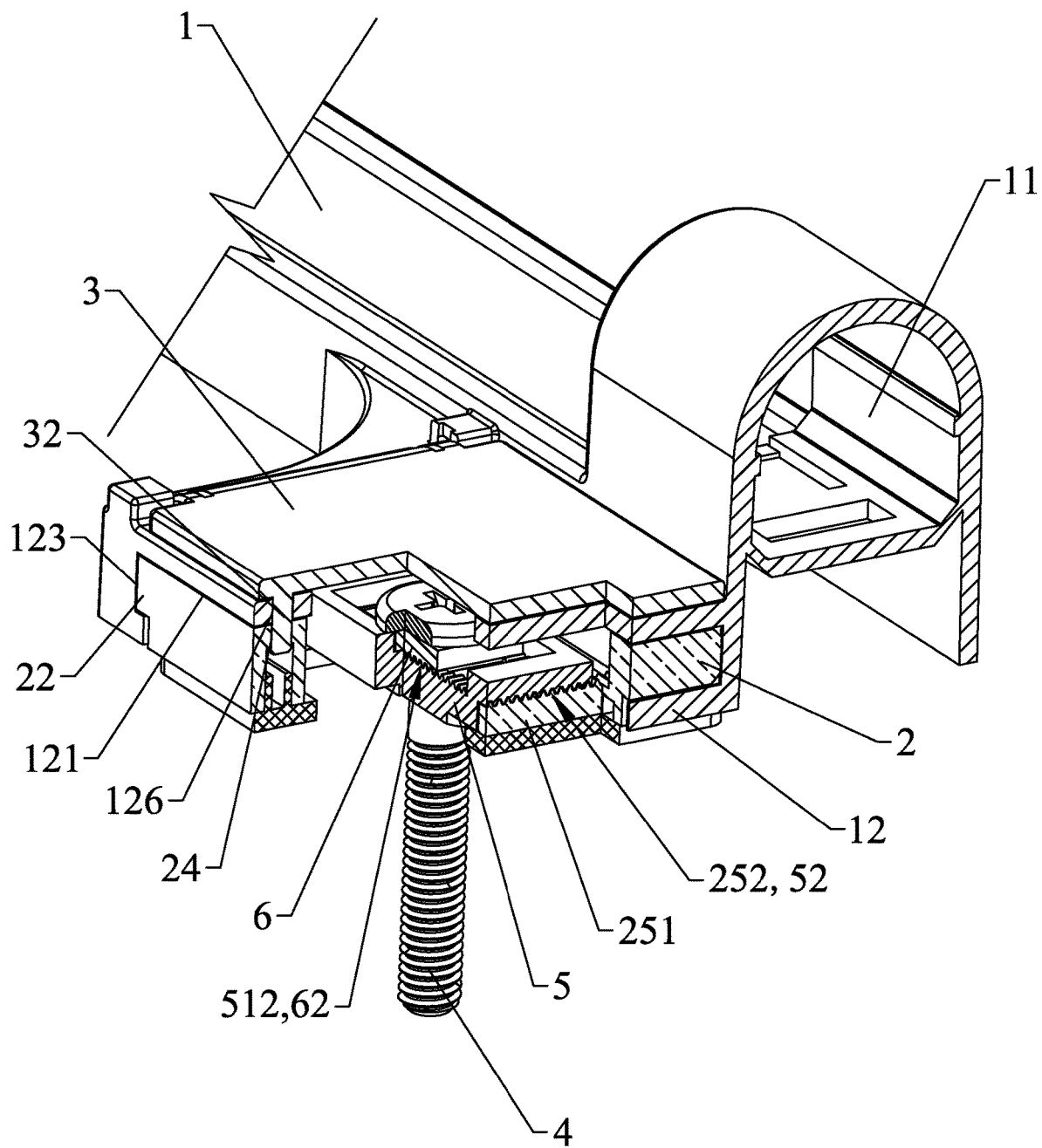
FIG. 13 shows a sectional view of the first embodiment of the present invention along line A-A of FIG. 12.
Figure 14:
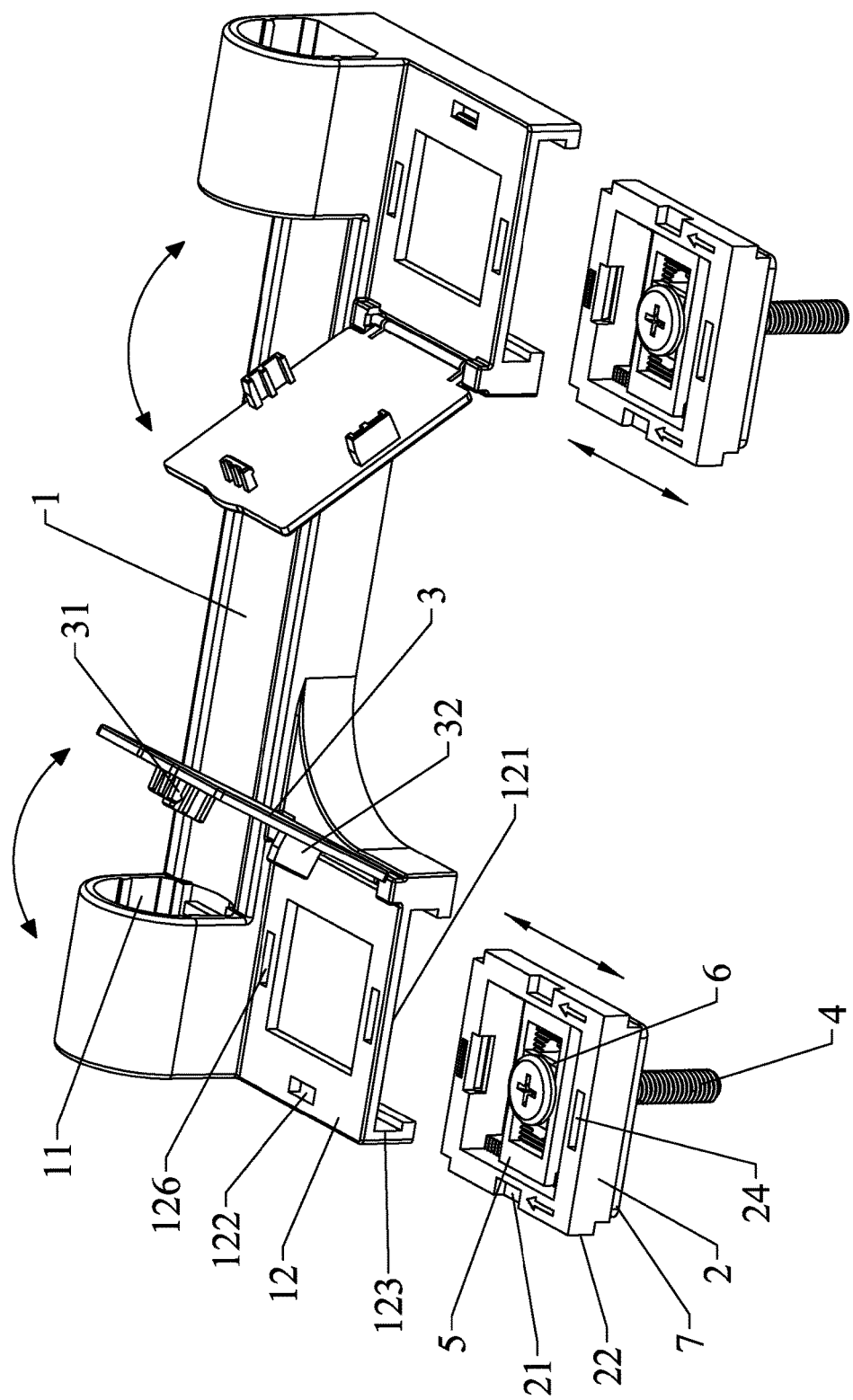
FIG. 14 shows a disassembling process of the first embodiment of the present invention in a perspective view.

As illustrated in FIGS. 14-15, a quick assembly and disassembly mechanism of the first embodiment is as follows:

The base boards 2, the bolts 4, the front-rear locking blocks 5, the left-right locking blocks 6 and the anti-skid pads 7 are formed as a whole and being fixed on the ceramic body of the toilet bowl; the supporting base 1 and the toilet seat 8 (comprising an upper lid and an oval seat) are formed as a whole. During assembly, first aligning the each sliding groove 121 of the supporting base 1 with a corresponding base board 2, and fitting each base board 2 inside a corresponding sliding groove 121 by pushing the supporting base 1 towards the base boards 2; then, closing each lid body 3 onto a top surface of a corresponding connecting portion 12, so that each buckle 31 passes through a corresponding buckle hole 122 and buckles to a corresponding buckle groove 21 of a corresponding base board 2, thereby preventing each lid body 3 to be flipped up easily; meanwhile, a positioning function of each base board 2 is achieved by each positioning rib 32 which passes through a corresponding positioning hole 126 and is embedded into a corresponding positioning groove 24, so as to limit each base board 2 inside a corresponding sliding groove 121 from sliding back and forth in the corresponding sliding groove 121, and fix the supporting base 1 on the ceramic body, thus completing a quick assembly process; during disassembly, flipping up each lid body 3, so that each buckle 31 is detached from a corresponding buckle groove 21, and each positioning rib 32 is detached from a corresponding positioning groove 24, so as to release each base board 2 from being limited to move; then, detaching the supporting base 1 from the base boards 2 by pulling the supporting base 1 away from the base boards 2, thus completing a quick disassembly process.

A Second Embodiment of the Present Invention is Illustrated in FIGS. 16-24

The second embodiment comprises rotary locking blocks 9 and radial locking blocks 10; each base board 2 is provided with a round-shaped third adjusting hole 27; each rotary locking block 9 is in rotary fit with a corresponding third adjusting hole 27, so that an orientation of each rotary locking block 9 is adjustable by rotation with respect to the corresponding third adjusting hole 27; each rotary locking block 9 is provided with a forth adjusting hole 91 extending along a radial direction thereof; each radial locking block 10 is movably fitted with a corresponding forth adjusting hole 91, and is capable of adjusting position along a radial direction of a corresponding rotary locking block 9; each radial locking block 10 is provided with a second bolt hole 101 to receive a corresponding bolt 4. A position of each bolt 4 within a corresponding base board 2 can be adjusted through rotation of a corresponding rotary locking block 9 and radial movement of a corresponding locking block 10 on the corresponding rotary locking block 9; therefore, a structure of the toilet seat base is adaptable to deviations of different toilet installation holes as well as different toilet bowls in accordance with a variety of national standards and brands, thereby achieving wider versatility.

Furthermore, a side wall of each third adjusting hole 27 is provided with an annular third protruding edge 271; a top surface of each third protruding edge 271 is provided with a plurality of fifth anti-skid teeth 272; a periphery of each rotary locking block 9 is movably fitted with a corresponding third protruding edge 271, and is provided with a plurality of sixth anti-skid teeth 92 meshing with the fifth anti-skid teeth 272 of a corresponding third adjusting hole 27. Meshing between the fifth anti-skid teeth 272 and corresponding sixth anti-skid teeth 92 prevents each rotary locking block 9 to rotate along a corresponding third protruding edge 271, thereby maintaining a stability of each rotary locking block 9 after a position adjustment; meanwhile, each rotary locking block 9 is in clearance fit with a side wall of a corresponding third protruding edge 271.

Furthermore, two sides of each forth adjusting hole 91 is provided with forth protruding edges 911 respectively; a top surface of each forth protruding edge 911 is provided with a plurality of seventh anti-skid teeth 912; two sides of each radial locking block 10 are fitted with the forth protruding edges 911 on the two sides of a corresponding forth adjusting hole 91, and are provided with a plurality of eighth anti-skid teeth 102 meshing with the seventh anti-skid teeth 912 of the corresponding forth adjusting hole 91. Meshing between the seventh anti-skid teeth 912 and corresponding eighth anti-skid teeth 102 prevents each radial locking block 10 to slide on corresponding forth protruding edges 911, thereby maintaining a stability of each radial locking block 10 after a position adjustment; meanwhile, each radial locking block 10 is in clearance fit with side walls of a corresponding forth adjusting hole 91.

Other aspects of the second embodiment are the same as the first embodiment; An anti-skid pad 7 is provided below each base board 2, the anti-skid pad 7 improves an anti-skid effect of the toilet seat base after being assembled onto the ceramic body, and reduces shaking of the toilet seat base and the assembled toilet seat on the ceramic body.

Furthermore, a bottom surface of each base board 2 is provided with a plurality of inserting grooves 26; a top surface of each anti-skid pad 7 is provided with a plurality of inserting blocks 71 matching with the inserting grooves 26 of a corresponding base board 2; a detachable fit of each anti-skid pad 7 and a corresponding base board 2 is achieved by embedding the inserting blocks 71 of said anti-skid pad 7 into the inserting grooves 26 of said base board 2; the inserting blocks 71 herein are embodied slightly differently from the inserting blocks 71 in the first embodiment.

Figure 24:
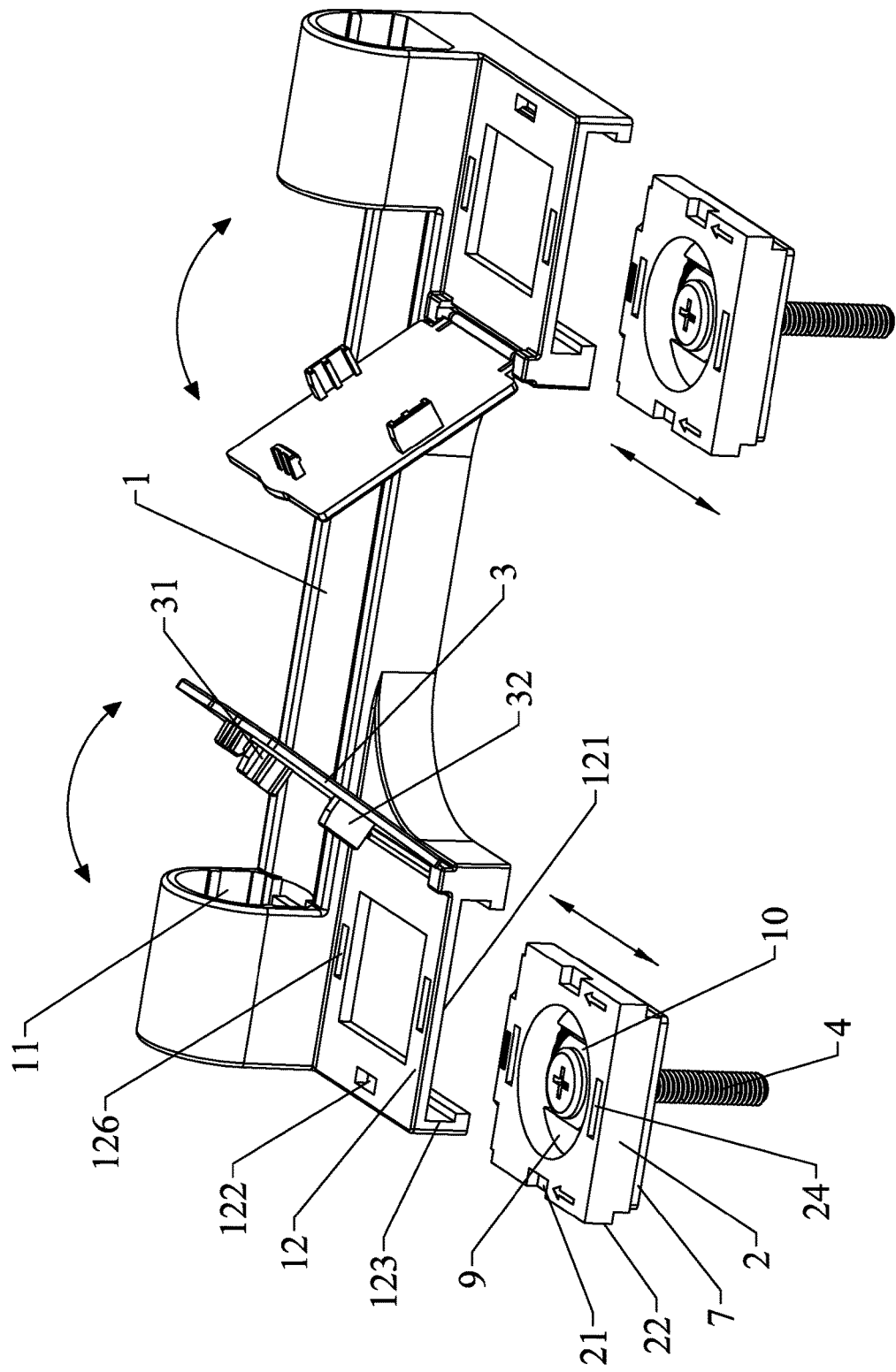
FIG. 24 shows a disassembling process of the second embodiment of the present invention in a perspective view.

As illustrated in FIGS. 24, a quick assembly and disassembly mechanism of the present invention as follows:

The base boards 2, the bolts 4, the rotary locking blocks 9, the radial locking blocks 10 and the anti-skid pads 7 are formed as a whole and being fixed on the ceramic body of the toilet bowl; the supporting base 1 and the toilet seat 8 (comprising an upper lid and an oval seat) are formed as a whole. During assembly, first aligning each sliding groove 121 of the supporting base 1 with a corresponding base board 2, and fitting each base board 2 inside a corresponding sliding groove 121 by pushing the supporting base 1 towards the base boards 2; then, closing each lid body 3 onto a top surface of a corresponding connecting portion 12, so that each buckle 31 passes through a corresponding buckle hole 122 and buckles to a corresponding buckle groove 21 of a corresponding base board 2, thereby preventing each lid body 3 to be flipped up easily; meanwhile, a positioning function of each base board 2 is achieved by each positioning rib 32 which passes through a corresponding positioning hole 126 and is embedded into a corresponding positioning groove 24, so as to limit each base board 2 from moving back and forth inside the corresponding sliding groove 121, and fix the supporting base 1 on the ceramic body, thus completing a quick assembly process; during disassembly, flipping up each lid body 3, so that each buckle 31 is detached from a corresponding buckle groove 21, and each positioning rib 32 is detached from a corresponding positioning groove 24, so as to release each base board 2 from being limited to move; then, detaching the supporting base 1 from the base boards 2 by pulling the supporting base 1 away from the base boards 2, thus completing a quick disassembly process. Unlike the first embodiment, when each base board 2 is being assembled, an orientation of each fourth adjusting hole 91 is adjusted by rotating a corresponding rotary locking block 9, thereby limiting an orientation of a corresponding radial locking block 10; then, a position of each second bolt hole 101 is adjusted by adjusting a radial position of each radial locking block 10 inside a corresponding rotary locking block 9.

Furthermore, the aforementioned supporting base 1 is illustrated as an integrated sleeve, but it can also be achieved by other structures; for example, the corresponding axial hole portion 11 and connecting portions 12 provided on each of the two ends of the supporting base 1 can be designed as an independent base body so that two independent base bodies are formed on the two ends of the support base 1 respectively, and no connection is provided between the two independent base bodies. The aforementioned base boards 2 are illustrated as a two independent parts, but they can also be achieved by other structures; for example, the two base boards 2 can be connected as an integral structure by adding a board or a rod in between; by analogy, the anti-skid pads 7 can also be designed as an integral structure.

Through the above solutions, the present invention limits or allows the movement of each base board 2 inside a corresponding sliding groove 121 by a flipping movement of each lid body 3 on a top surface of a corresponding connecting portion 12 of the supporting base 1, thereby achieving a quick assembly and disassembly of the supporting base 1 and the base boards 2, in other words, completing a quick assembly and disassembly of the toilet seat base on the ceramic body of the toilet bowl; it is convenient for cleaning simply by removing the supporting base 1 and the toilet seat 8 assembled thereon; the present invention does not require the use of an elastic piece, so that each component thereof has a stable structure without elastic deformation, which is capable of maintaining a stable operating status, and providing a longer service life; an assembling or disassembling operation of the present invention can be completed simply by flipping up or down each lid body 3, and pushing or pulling the supporting base 1, while the operating process is completely visible, thus achieving an easy and convenient operation.

What is claimed is:

1. A toilet seat base, comprising:
a supporting base, base boards and lid bodies;
two ends of a top surface of the supporting base are provided with axial hole portions respectively configured for installing a toilet seat; two ends of a rear side of the supporting base are provided with connecting portions respectively; a rear side of each connecting portion is provided with a sliding groove extending towards a front side of the connecting portion;
each base board is slidable back and forth within a corresponding sliding groove and being limited from moving along a vertical direction within the corresponding sliding groove;
one end of each lid body is pivotally connected with a corresponding connecting portion; a bottom surface of each lid body is provided with a plurality of positioning ribs; a top surface of each connecting portion is provided with positioning holes; the positioning holes of each connecting portion are in communication to a corresponding sliding groove; each base board is provided with positioning grooves; when each lid body is closed, the positioning ribs thereof pass through the positioning holes of a corresponding connecting portion, and fit with the positioning grooves of a corresponding base board, so that each base board and a corresponding sliding groove are fixed in position with respect to each other when each based board is slid inside the corresponding sliding groove;
each base board is fixed by a bolt; each connecting portion is provided with an operating window for tightening and twisting a corresponding bolt;
the toilet seat base further comprises rotary locking blocks and radial locking blocks; each base board is provided with a round-shaped third adjusting hole; each rotary locking block is in rotary fit with a corresponding third adjusting hole, so that an orientation of each rotary locking block is adjustable by rotation with respect to the corresponding third adjusting hole; each rotary locking block is provided with a forth adjusting hole extending along a radial direction thereof; each radial locking block is movably fitted with a corresponding forth adjusting hole, and is capable of adjusting position along a radial direction of a corresponding rotary locking block; each radial locking block is provided with a second bolt hole to receive a corresponding bolt.

2. The toilet seat base of claim 1, wherein left and right side walls of each sliding groove are provided with guiding grooves respectively; a front end of each guiding groove is provided with a limiting rib; left and right sides of each base board are provided with guiding ribs respectively; each guiding rib is in a sliding fit with a corresponding guiding groove and is in contact with a corresponding limiting rib; a top wall of each sliding groove is provided with a pre-assembled rib; a top surface of each base board is provided with a pre-assembled groove; each pre-assembled rib is removably fitted inside a corresponding pre-assembled groove; each pre-assembled rib is provided with a trapezoidal cross sectional surface or an arc-shaped cross sectional surface.

3. The toilet seat base of claim 1, wherein a bottom surface of another end of each lid body is provided with a buckle; the top surface of each connecting portion is provided with a buckle hole which is in communication to a corresponding sliding roove; each base board is provided with a buckle groove; when each lid body is closed, the buckle thereof passes through a corresponding buckle hole and is buckled to a corresponding buckle groove.

4. The toilet seat base of claim 1, wherein an anti-skid pad is provided below each base board; a bottom surface of each base board is provided with a plurality of inserting grooves; a top surface of each anti-skid pad is provided with a plurality of inserting blocks matching with the inserting grooves of a corresponding base board; the inserting blocks of each anti-skid pad are inserted into the inserting grooves of the corresponding base board.

5. The toilet seat base of claim 1, wherein a side wall of each third adjusting hole is provided with an annular third protruding edge; a top surface of each third protruding edge is provided with a plurality of fifth anti-skid teeth; a periphery of each rotary locking block is movably fitted with a corresponding third protruding edge, and is provided with a plurality of sixth anti-skid teeth meshing with the fifth anti-skid teeth of a corresponding third adjusting hole.

6. The toilet seat base of claim 1, wherein two sides of each forth adjusting hole is provided with forth protruding edges respectively; a top surface of each forth protruding edge is provided with a plurality of seventh anti-skid teeth; two sides of each radial locking block are fitted with the forth protruding edges on the two sides of a corresponding forth adjusting hole, and are provided with a plurality of eighth anti-skid teeth meshing with the seventh anti-skid teeth of the corresponding forth adjusting hole.

* * * * *